United States Patent [19]

Steckler et al.

[11] 4,009,201
[45] Feb. 22, 1977

[54] POLYMERIZABLE CATIONIC MONOMERS
[75] Inventors: Robert Steckler, Crofton; Seymour Martin Linder, Baltimore, both of Md.
[73] Assignee: Alcolac Inc., Baltimore, Md.
[22] Filed: May 20, 1974
[21] Appl. No.: 471,441
[52] U.S. Cl. .................... 260/486 R; 260/243 B; 260/293.87; 260/247.2 B; 260/326.43; 526/260; 526/263; 526/310; 526/320
[51] Int. Cl.$^2$ .................................... C07C 69/54
[58] Field of Search ............ 260/486 R, 247.2 B, 260/243 B, 293.87, 326.43

[56] References Cited
UNITED STATES PATENTS 3,766,156  10/1973  Kine et al. .................... 260/486 R

*Primary Examiner*—Paul J. Killos
*Attorney, Agent, or Firm*—George L. Tone

[57] ABSTRACT

Novel polymerizable cationic monomers, which contain two or more cationic groups in the molecule, and homopolymers and copolymers thereof are described. These novel cationic monomers are compounds represented by the general formula:

$$R-CH=C(R^1)(CH_2)_n COO \left[ -A-N^+(R^2)(R^3)- \right]_m -A-N(R^3)(R^2) \quad \text{Formula 1}$$
with $X^-$ and the quaternized derivatives thereof (in which the terminal tertiary amino group has been quaternized to a quaternary ammonium group) of the formula:

$$R-CH=C(R^1)(CH_2)_n COO \left[ -A-N^+(R^2)(R^3)- \right]_m -A-N^+(R^2)(R^3)-R^4 \quad \text{Formula 2}$$
with $X^-$ and $Y^-$ In the forgoing Formulas 1 and 2:
A, each of which may be the same or different, represents an alkylene group of from 1 to about 20 carbon atoms but including oxygen interrupted alkylene groups (i.e.; a polyglycol ether group of the formula $$(CH_2-CH(R^5)-O)_x$$

wherein $R^5$ represents H, methyl or ethyl and $x$ represents an integer of from 1 to about 20);
R represents H or methyl;
$R^1$ represents H or, when R is H, an alkyl group of 1 to 4 carbon atoms, $R^1$ preferably H or methyl;
$R^2$, $R^3$ and $R^4$, each of which may be the same or different, each represents alkyl of from 1 to about 20 carbon atoms, aryl (preferably phenyl), alkaryl (preferably benzyl) or the $R^2$ and $R^3$, on the same nitrogen atom, taken together may represent a divalent aliphatic group of 4 to 5 atoms which jointly with the amino nitrogen forms a five or six membered heterocyclic amino group such as pyrrolidinyl, piperidinyl, morpholino or thiamorpholino and these groups may have a lower alkyl substituent such as a methyl or ethyl group:
X and Y, each of which may be the same or different, each represents an anion (forming the anionic portion of a quaternary ammonium group) such as a halogen ion (fluorine, chlorine, bromine or iodine), a sulfate ion, a hydroxyl ion or a nitrate ion, X is preferably chlorine or bromine and Y is preferably chlorine, bromine or lower alkyl sulfate (i.e.; methyl or ethyl sulfate), and in case there are two or more X's in the molecule each of them may be the same or different;
$n$ represents an integer, including 0, of from 0 to about 10; and
$m$ represents an integer of from 1 to about 5.

These polymerizable cationic monomers are of primary interest for the production of polymers and more particularly copolymers (with such co-monomers as styrene, vinyl acetate, vinyl chloride, acrylic esters, acrylamide and acrylonitrile) but including homopolymers, especially in the case of compounds in which the acyl group is that of acrylic acid or methacrylic acid, having cationic properties with resultant improvement in such properties as adhesion, anti-static properties, dye receptivity, etc.

16 Claims, No Drawings

POLYMERIZABLE CATIONIC MONOMERS

BACKGROUND OF THE INVENTION

The present invention relates to novel polymerizable cationic monomers and to homopolymers and copolymers thereof. The novel polymerizable monomers of this invention are polymerizable esters, the acyl group of which is that of certain ethylenically unsaturated carboxylic acids and the alcoholic component of which is that of an alcohol containing two or more cationic groups. All of the cationic groups may be quaternary ammonium groups or the terminal cationic group may be a tertiary amino group.

A number of polymerizable cationic monomers, particularly polymerizable cationic acrylic ester monomers, are well known in the art and are finding substantial commercial use for the production of polymers having cationic properties. Such polymerizable cationic monomers are used for the production of homopolymers and more especially for the production of copolymers with such monomers as acrylic esters (e.g., ethyl acrylate or methyl methacrylate), styrene, vinyl acetate, vinyl chloride, acrylamide and acrylonitrile. As examples of commercially available cationic acrylate and methacrylate monomers may be mentioned dimethylaminoethyl methacrylate $CH_2=C(CH_3)COO-CH_2CH_2N(CH_3)_2$ and its quaternization products such as its quaternization product with dimethyl sulfate which can be represented by the formula:

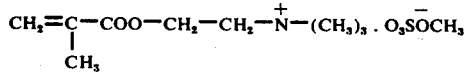

or its quaternization product with methyl chloride which can be represented by the formula

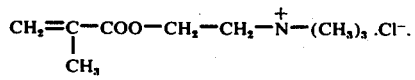

Another such cationic arcylic ester monomer which is commercially available is the quaternization product of 1-chloro-2-hydroxypropyl methacrylate and trimethyl amine, made by the reaction of methacrylic acid, epichlorohydrin and trimethyl amine and represented by the formula

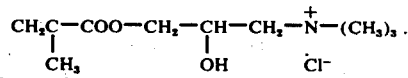

The foregoing commercially available polymerizable cationic acrylic ester monomers are characterized by the presence of a single tertiary amino group or a single quaternary ammonium group in the molecule. Consequently, particularly in the production of copolymers, where a high degree of cationic functionality is desired in the polymer backbone, it is necessary to use a high proportion of these cationic monomers to its comonomer. While such high relative proportion of these cationic monomers is desirable to increase the cationic functionality of the polymer backbone, it may at the same time dilute or adversely affect other desirable properties contributed by the comonomer to the resulting copolymer.

SUMMARY OF THE INVENTION

We have now discovered certain polymerizable cationic esters, the acyl group of which is that of certain ethylenically unsaturated carboxylic acids the alcoholic component of which is that of an alcohol containing two or more cationic groups. All of the cationic groups may be quaternary ammonium groups or the terminal cationic group may be a tertiary amino group.

These novel monomers, when used in the same molar proportions as the well known commercial cationic monomers mentioned above, impart a higher degree cationic functionality to polymers produced therefrom and, in the case of copolymers, the same degree of cationic functionality can be obtained in copolymers produced by their use in a substantially lower molar proportion.

These novel polymerizable cationic monomers can be represented by the formula:

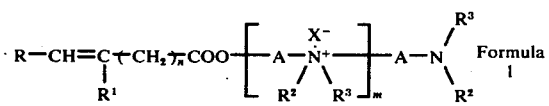

and the quaternized derivatives thereof (in which the terminal tertiary amino group has been quaternized to a quaternary ammonium group) of the formula:

In the foregoing Formulas 1 and 2:

A, each of which may be the same or different, represents an alkylene group of from 1 to about 20 carbon atoms but including oxygen interrupted alkylene groups (i.e.; polyglycol ether group of the formula

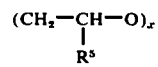

wherein $R^5$ represents H, methyl or ethyl and $x$ represents an integer of from 1 to about 20);

R represents H or methyl;

$R^1$ represents H or, when R is H, an alkyl group of 1 to 4 carbon atoms, preferably H or methyl;

$R^2$, $R^3$ and $R^4$, each of which may be the same or different, each represents alkyl of from 1 to about 20 carbon atoms, aryl (preferably phenyl), alkaryl (preferably benzyl) or the $R^2$ and $R^3$, on the same nitrogen atom, taken together may represent a divalent aliphatic group of 4 to 5 atoms which jointly with the amino nitrogen forms a five or six membered heterocyclic amino group such as pyrrolidinyl, piperidinyl, morpholino or thiamorpholino and these groups may have a lower alkyl substituent such as a methyl or ethyl group;

X and Y, each of which may be the same or different, each represents an anion (forming the anionic portion of a quaternary ammonium group) such as a halogen ion (fluorine, chlorine, bromine or iodine), a sulfate ion, a hydroxyl ion or a nitrate ion X is preferably chlorine or bromine and Y is preferably chlorine, bromine or lower alkyl sulfate (i.e.; methyl or ethyl sulfate), and in case there are two or more Xs in the molecule each of them may be the same or different;

$n$ represents an integer, including 0, of from 0 to about 10; and $m$ represents an integer of from 1 to about 5.

Homopolymers and copolymers — with such monomers as styrene, vinyl acetate, vinyl chloride, acrylic esters (e.g., ethyl acrylate or methyl methacrylate), acrylamide or acrylonitrile — which may be produced by conventional acrylic ester polymerization and copolymerization techniques, possess two important characteristics — high polarity and strong affinity for anionic materials. The cationic properties of the resulting polymers and copolymers account for improved adhesion to glass, fiberglass, metals, hair, fibers and pigmented primers. In addition, anti-static properties, dye receptivity, soil repellancy, etc., can contribute to other polymers by co-polymerization with various amounts of novel monomers. These properties suggest the use of the homopolymers as well as their copolymers in manufacturing flocculants, retention aids, cationic thickeners, hair polymers, dye receptive synthetic fibers and coatings, anti-static fibers and coatings and additives to reduce the surface and volume resistivity of paper and synthetic resins and fibers.

By copolymerizing our novel polycationic monomers in emulsion systems, self-stabilizing cationic emulsions are obtained from which can be deposited films with outstanding wet adhesion, scrub resistance and resistance to alkalis, salt spray and water spotting.

DESCRIPTION OF THE PREFERRED EMBODIMENTS

The novel monomers of the present invention, of Formula 1 and Formula 2 above, may be produced by quaternization, using conventional quaternization techniques, of a tertiary amine of the formula:

Formula 3
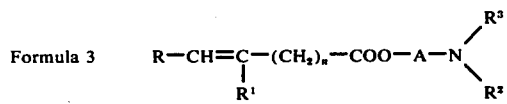

wherein A, R, $R^1$, $R^2$, $R^3$ and $n$ are as defined above, with a halogen containing tertiary amine or a quaternized halogenated tertiary amine respectively.

Starting Materials and Method of Making Same

A number of tertiary amines of Formula 3 are known in the art, for example dimethylaminoethyl methacrylate mentioned above. This and other tertiary amines of Formula 3 may be produced by an ester interchange reaction, using conventional ester interchange reaction techniques, between a lower alkyl (preferably methyl or ethyl) ester of an ethylenically unsaturated carboxylic acid, the acyl group of which corresponds to the acyl group shown in Formula 3, with a tertiary amino alcohol.

As examples of suitable esters for use in such an ester interchange reaction may be mentioned the methyl and ethyl esters of such ethylenically unsaturated acids as: acrylic acid, methacrylic acid, α-ethylacrylic acid, α-propylacrylic acid, α-butylacrylic acid, crotonic acid, β-butenic acid (vinyl acetic acid), γ-pentenic acid (allyl acetic acid), and undecylenic acid. We particularly prefer the methyl and ethyl esters of acrylic acid, methacrylic acid and crotonic acid.

As examples of suitable tertiary amino alcohols for use in such an ester interchange reaction to produce tertiary amines of Formula 3 in which the group A is an alkyl group may be mentioned such N-dialkylamino alkanols as: 2-dimethylaminoethanol, 2-diethylaminoethanol, 2-ethyl-2-benzylaminoethanol, 2-dioctylaminoethanol, 2-methyl-2-octadecylaminoethanol, 2-methyl-2-dodecylaminoethanol, also N-dimethylaminopropanol-3, N-diethylaminobutanol-4, N-dimethylaminodecanol-1, N-dimethylaminoeicosanol-20; also such N-benzyl-N-alkylalkanols as N-ethyl-N-benzylaminoethanol, N-methyl-N-benzylaminobutanol-4, N-dodecyl-N-benzylaminoethanol; also such N-alkyl-N-ω hydroxyalkylanilines as: N-methyl-N-βhydroxyethyl aniline, N-ethyl-N-βhydroxyethyl aniline, and N-methyl-N hydroxypropyl aniline and N-α hydroxyethyl diphenylamine. As examples of tertiary heterocyclic amino alcohols may be mentioned β-hydroxyethylpiperidine, β-hydroxyethylpyrrolidine, and 4-(β-hydroxyethyl)-morpholine.

Tertiary amines of Formula 3 above in which the group A is an oxygen interrupted aliphatic group may be produced by using in such an ester interchange reaction a tertiary amino alcohol obtained by condensing from 1 to about 10 molar proportions of a lower alkylene oxide (i.e. ethylene oxide, propylene oxide or 1-2-butylene oxide) with a secondary amine such as dimethylamine, diethylamine, dioctylamine, N-methyl-N-decylamine, N-methyl-N-octadecylamine and such commercially available secondary fatty amines as Adogen 240 bishydrogenated tallow amine- available from Archer Daniels Midland Co., Minneapolis, Minnesota; Armeen 2C available from Armour Industrial Chemical Co., Illinois; or Alamine 4,5,6,7,11,15,21,26 and H26 available from General Mills, Chemical Division, Kankakee, Ill. Such amino alcohols obtained by the condensation of an alkylene oxide with a secondary amine may be represented by the formula:

Formula 4
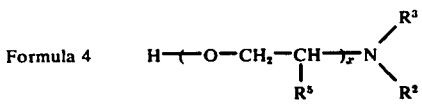

wherein $R^2$ and $R^3$ are as priviously as defined, $R^5$ is H, methyl or ethyl and $x$ is an integer having an average value of from 1 to 20 corresponding to the number of moles of alkylene oxide per mole of secondary amine.

Method of Making Products of Formula 1

As previously stated, the novel monomers of the present invention represented by Formula 1 above may be produced by quaternization of a tertiary amine of Formula 3 above with a halogen derivative of a tertiary amino alcohol; i.e., a halogenated tertiary amine. In this quaternization the halogen (preferably chlorine or bromine) derivatives of any of the amino alcohols mentioned above may be used. The quaternization proceeds as shown in Equation B below:

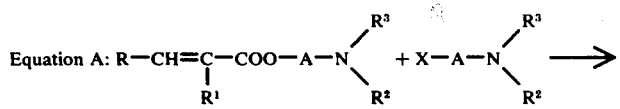

Equation A: $R-CH=C(R^1)-COO-A-N(R^3)(R^2) + X-A-N(R^3)(R^2) \rightarrow$

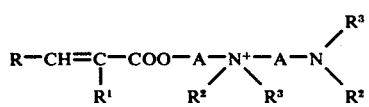

$R-CH=C(R^1)-COO-A-N^+(R^2)(R^3)-A-N(R^3)(R^2)$ wherein A, B, R, $R^1$, $R^2$, $R^3$ and X are as defined above.

It is preferred that the halogenated tertiary amine, used for the quaternization, contain only a single halogen substituent; since, if two or more halogens are present therein, each of them may react with a molecule of the tertiary amine which is being quaternized to give a product containing two ethylenically unsaturated acyl groups and such a product would act as a cross-linker in any subsequent polymerization.

If products of Formula 1 containing three or more cationic groups in the molecule are desired (i.e., products of Formula 1 in which $m$ is 2 or higher), it will be apparent that the product of Equation A (which is a product of Formula 1 in which $m$ is 1) may be further quaternized with a halogenated tertiary amine of the type used in Equation A to produce a product of the following formula:

Formula 5   $R-CH=C(R^1)-(CH_2)_n-COO-A-N^+(R^2)(R^3)-A-N^+(R^2)(R^3)-A-N(R^3)(R^2)$  $X^-$  $X^-$ By repeated quaternizations in this manner the number of cationic groups in the product can be increased to four, five or if desired somewhat higher.

Method of Making Products of Formula 2

The products of Formula 2 may be produced by quaternizing the tertiary amine terminated products of Formula 1 to convert the terminal tertiary amine group thereof into a quaternary ammonium group; so that all the cationic groups in the molecule, including the terminal cationic group, are quaternary ammonium groups. This quaternization may be effected using any of the usual quaternizing agents, preferably a lower alkyl halide or dimethylsulfate, specific quaternizing agents which may be used include methyl chloride, methyl bromide, methyl iodide, ethyl chloride, ethyl bromide, ethyl iodide, n-propyl chloride, n-propyl bromide, n-propyl iodide, isopropyl bromide, isobutyl bromide, n-butyl chloride, n-butyl bromide, sec.-butyl bromide, n-amyl bromide, n-hexyl chloride, benzyl chloride, dimethyl sulfate, and diethyl sulfate.

It will be apparent that if the product of Equation A is quaternized with one of the usual quaternizing agents, mentioned in the immediately preceding paragraph, the resulting product so obtained will have the following formula:

Formula 6   $R-CH=C(R^1)-(CH_2)_n-COO-A-N^+(R^2)(R^3)-A-N^+(R^2)(R^3)-R^4$  $X^-$  $X^-$ On the other hand, if the product of equation A is first quaternized with a halogenated tertiary amine to produce a product of Formula 5 and this product is then quaternized with one of the usual quaternizing agents the resulting product so obtained will have the following formula:

Formula 7   $R-CH=C(R^1)-(CH_2)_n-COO-A-N^+(R^2)(R^3)-A-N^+(R^2)(R^3)-A-N^+(R^2)(R^3)-R^4$  $X^-$  $X^-$  $Y^-$ Both of these products (of Formula 6 and Formula 7 in which A, R, $R^1$, $R^2$, $R^3$, $R^4$, X and Y are as previously defined,) fall within the scope of Formula 2 and are products in which all of the cationic groups, including the terminal cationic group, are quaternary ammonium groups.

It will also be apparent that products falling within the scope of Formula 2; e.g., products of Formula 6 or Formula 7, in which all of the cationic groups in the molecule including the terminal cationic group are quaternary ammonium groups, may be produced by quaternizing a tertiary amine of Formula 3 or the product of Equation A respectively with a halogenated quaternized tertiary amine; rather than, as heretofore described, first quaternizing such a tertiary amine, of Formula 3 or the product of Equation A respectively, with a halogenated tertiary amine followed by quaternization of the terminal tertiary amine group, so added to the molecule, with one of the usual quaternizing agents. If a tertiary amine terminated product of Formula 5 is so quaternized with a halogenated quaternized tertiary amine the resultant product will contain four quaternary ammonium groups and thus be a product of Formula 2 in which $m$ is 3.

The method of producing the quaternary ammonium group terminated products described in the immediately preceding paragraph proceeds as shown in Equation B below:

Equation B

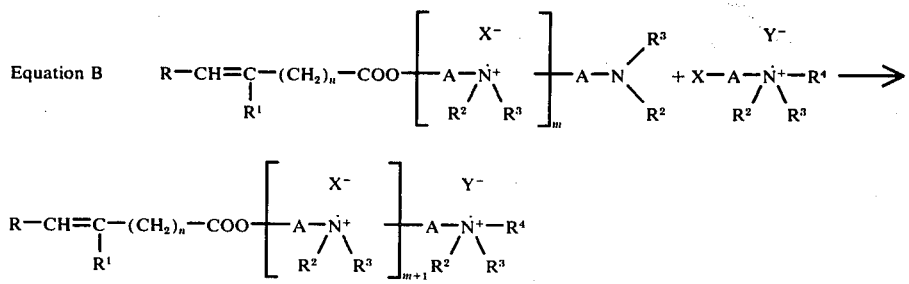

wherein A, R, R¹, R², R³, R⁴, X, Y, $n$ and $m$ are as defined above.

Reaction Conditions for Quaternization

All of the foregoing quaternizations may be carried out using conventional quaternization techniques and reaction conditions. Temperatures in the range of from about 0° C. to the reflux temperature of the reaction mixture but usually not over about 100° C. and preferably in the range of 20° to 60° C. may be used. It is preferred to use the mildest reaction temperatures possible commensurate with a substantially quantitative yield within a reasonable reaction time.

The quaternization may be carried out in the presence of a volatile solvent which is inert under the reaction conditions. Suitable solvents include water, benzene, toluene, ethyl ether, butanol, chloroform, 2-butanone, acetone and the like.

As is common in reactions involving acrylic or methacrylic acid and their esters, we prefer to incorporate a small amount of a polymerization inhibitor to assure against premature polymerization, particularly when the reaction is effected at slightly elevated temperatures and especially when the ester being quaternized is one whose acyl group is that of acrylic acid or methacrylic acid. A number of suitable polymerization inhibitors are known; we particularly prefer such inhibitors as hydroquinone, monomethyl ether of hydroquinone, and di-tert.-butyl-para-cresol (Ionol.) phenothiazine, and amine inhibitors such as N, N'-diphenyl-p-phenylene diamine, p-hydroxy diphenyl amine and di-β-naphthyl-p-phenylene diamine. When a polymerization inhibitor is used, it may be present in an amount of from 0.001 to 1.0% by weight of the acrylate or methacrylate used, preferably from about 0.1 to 0.5% by weight.

The details of the present invention will be apparent to those skilled in the art from the specific examples of preferred embodiments thereof which follow. The parts are by weight.

EXAMPLE 1

To a round bottom, three neck flask equipped with thermometer, dropping funnel, stirrer, reflux condenser, and heating mantle, there was charged 172 parts (1 mole) of diethylaminoethyl chloride hydrochloride and an equal amount by weight (172 parts) of water. The mixture was heated to 55° C. with stirring to effect solution and there was added 157 parts (1mole) of dimethylaminoethyl methacrylate containing about 0.9 parts of hydroquinone, as polymerization inhibitor. The reaction was slightly exothermic and the temperature was maintained at 55°–60° C. When the addition was complete, heating was continued at 60°–65° C., while stirring for several hours until the pH reached constant value (approx. 6.0). The reaction mixture was then cooled to room temperature and a sample analyzed. Analysis showed that the product so obtained contained about 4.25% of free methacrylic acid on a dry basis. The yield of desired quaternized product was about 90%.

The reaction proceeds as shown in the following Equation:

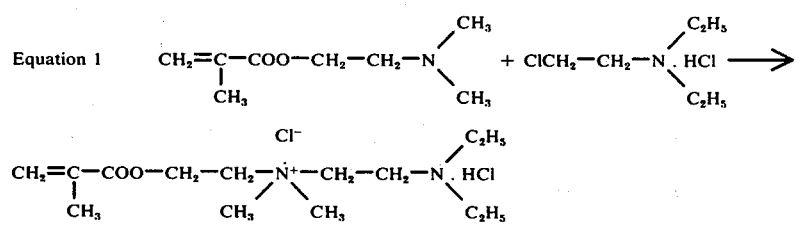

EXAMPLE 2

To 502 parts (one mole) of the 70% aqueous solution of the product prepared in Example 1 was gradually added a solution of 53 parts (0.5 mole) of sodium carbonate dissolved in 200 parts of water, keeping the temperature at 20°–25° C. This solution was filled into an autoclave equipped with agitation and then 0.5 parts (one mole) of methyl chloride gas was added to the mixture. The reaction was followed by observing the reduction in pressure of the system.

An aqueous solution of the bis-quaternary salt shown in the following equation was obtained.

Equation 2 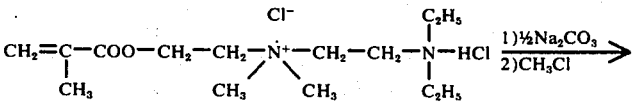

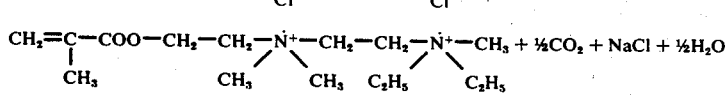

EXAMPLE 3

To 502 parts (one mole) of the 70% aqueous solution of the product of Example 1 was gradually added a solution of 53 parts (0.5 mole) of sodium carbonate dissolved in 200 parts of water, $CO_2$ gas is liberated and the free amine is obtained in solution. The mixture was cooled to 10° C. and 126 parts (one mole) of dimethyl sulfate was rapidly added. This solution was rapidly filled into an autoclave equipped with agitation and gradually warmed to about 35° C. The reaction was followed by observing the reduction in pressure in the system.

An aqueous solution of the bis-quaternary salt shown in the following equation was obtained.

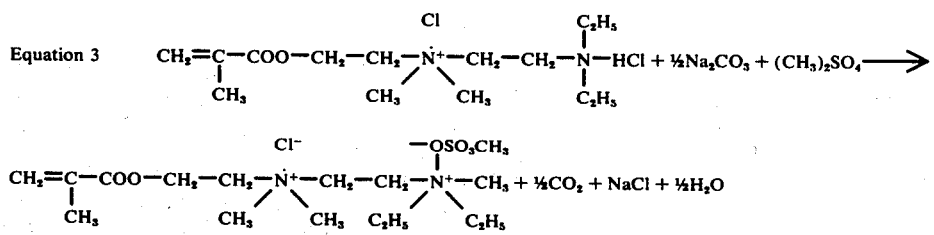

EXAMPLE 4

To 502 parts (one mole) of the 70% aqueous solution of the products of Example 1 was added gradually and simultaneously a solution of 172 parts (one mole) of diethylaminoethyl chloride hydrochloride in 172 parts of water and a solution of 53 parts (0.5 mole) of sodium carbonate in 200 parts of water. The temperature was held at 50°–55° C. during the addition. After about 5 hours, analysis showed the absence of organic chloride, indicating that all of the dimethylaminoethyl chloride had reacted.

An aqueous solution of the quaternary salt shown in the following equation was obtained.

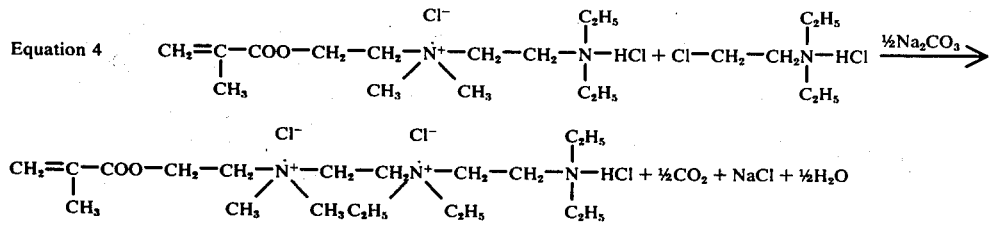

EXAMPLE 5

To 464.5 parts (one mole) of the product of Example 4 dissolved in 275 parts of water was gradually added a solution of 53 parts (0.5 mole) of sodium carbonate dissolved in 200 parts of water, keeping the temperature below 25° C. This solution was filled into an autoclave equipped with agitation and then 50.5 parts (one mole) of methyl chloride gas was passed into the mixture, the reaction being followed by observing the reduction in the pressure of the system.

An aqueous solution of the tris-quaternary salt shown in the following equation was obtained.

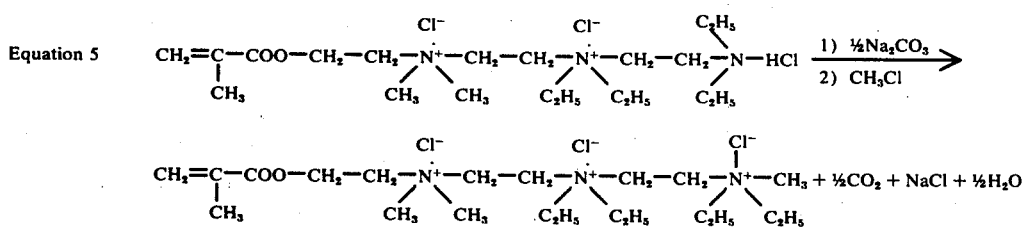

EXAMPLE 6

Following the procedure of Example 1, there was charged 200 parts (one mole) of B-diisopropyl-aminoethyl chloride hydrochloride in 250 parts of water and 157 parts (one mole) of dimethylaminoethyl methacrylate containing 0.9 parts of phenothiazine. The yield of the desired quaternary product was about 75%.

The reaction proceeds as shown in the following equation.

Equation 6 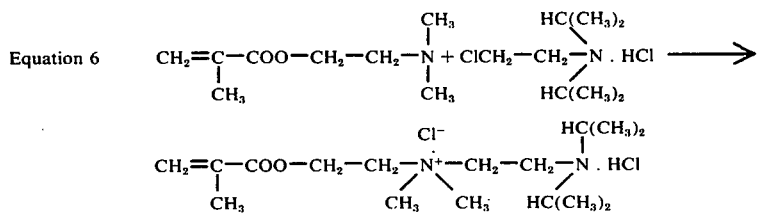

EXAMPLE 7

Following the procedure of Example 1, there was charged 158 parts (one mole) of chlorocholine chloride, 400 parts of water and 157 parts (one mole) of dimethylaminoethyl methacrylate containing about 0.9 parts of hydroquinone.

An aqueous solution of the bis-quaternary salt shown in the following equation was obtained.

Equation 7 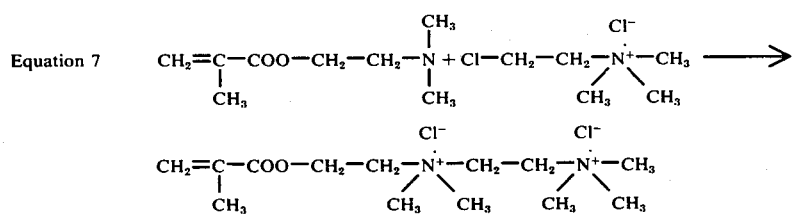

EXAMPLE 8

Following the procedure of Example 1, there was charged 404 parts (one mole) of the HCl salt of the chloro derivative of the five mole ethylene oxide adduct onto one mole dibutylamine (i.e. 2 chloroethyl (1-tetraethoxy) dibutylamine hydrochloride), 600 parts of water and 185 parts (one mole) of diethylaminoethyl methacrylate containing 1.0 part of monomethyl ether of hydroquinone. The yield of desired product was about 50–55%.

The reaction proceeds as shown in the following equation.

EXAMPLE 9

Following the procedure of Example 1, there was charged 186 parts (one mole) of N-(2-chloroethyl)-morpholine hydrochloride, 250 parts of water and 157 parts (one mole) of dimethylaminoethyl methacrylate containing about 0.9 parts of monomethyl ether of hydroquinone. The yield of desired quaternized product (Formula 9) was about 75%.

Formula 9 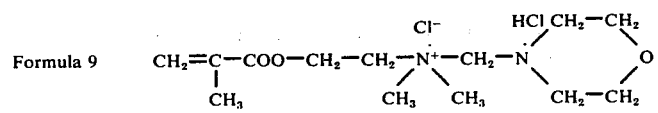

EXAMPLE 10

Following the procedure of Example 1, there was charged 228 parts (one mole) of 6-diethylaminohexyl chloride hydrochloride (prepared from 6-diethylaminohexanol-1 and thionyl chloride), 500 parts of water and 157 parts (one mole) of dimethylaminoethyl acrylate containing about 0.9 parts of hydroquinone. The yield of desired quaternized product was about 65–70%.

The reaction proceeds as shown in the following equation.

Equation 8 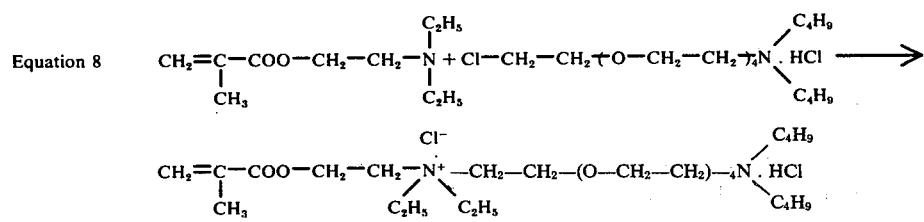

Equation 10 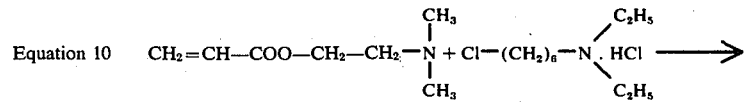

-continued

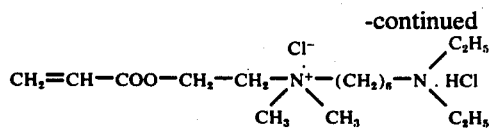

EXAMPLE 11

Following the procedure of Example 1, there was charged 144 parts (1 mole) of dimethylaminoethyl chloride hydrochloride, 144 parts of water and 157 parts (one mole) of dimethylaminoethyl methacrylate containing about 0.9 parts of hydroquinone. The yield of desired quaternized product was about 25%.

The reaction proceeds as shown in the following equation:

phenylamine hydrochloride, 600 parts of water and 185 parts (one mole) of diethylaminoethyl methacrylate containing 1.0 parts of the monomethyl ether of hydroquinone. The reaction proceeds as shown in the following equation:

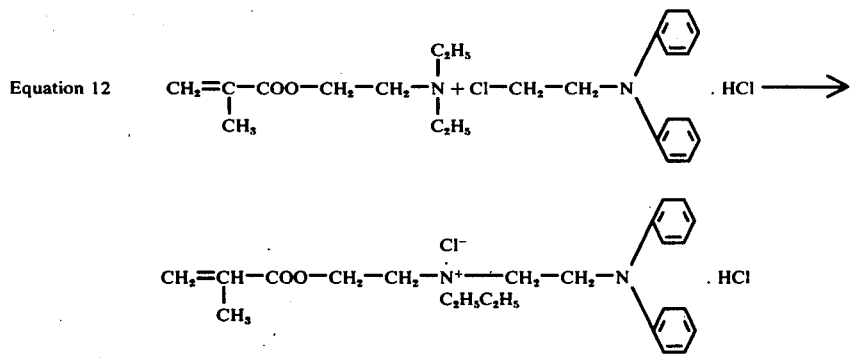

It will be understood that the foregoing specific examples are illustrative only of certain preferred embodiments of the present invention and that various changes, which will suggest themselves to those skilled in the art, may be made therein. In particular, it will be

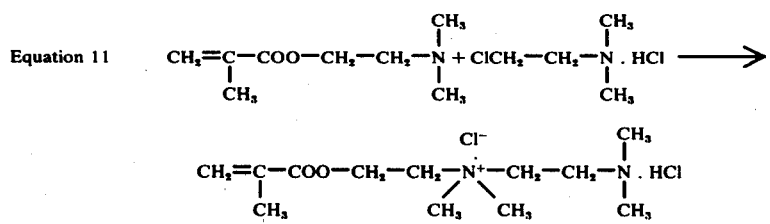

EXAMPLE 12

Following the procedure of Example 1, there was charged 172 parts (one mole) of diethylaminoethyl chloride hydrochloride in 172 parts of water and 157 parts (one mole) of dimethylaminoethyl crotonate containing 0.9 parts of monomethyl ether of hydroquinone.

The reaction proceeds as shown in the following equation:

apparent that numerous cationic monomers of the present invention, in addition to those illustrated in the specific examples, can readily be prepared, by analogous proceedures, by selection of the particular reactants employed for their preparation. For instance, by the use, as a starting material, of a tertiary amine of Formula 3 above, in which the acyl group is that of an acid such as vinylacetic acid, allylacetic acid or undecylenic acid so that $n$ in Formula 3 is from 1 to 10, cationic monomers of Formula 1 in which $n$ is also from

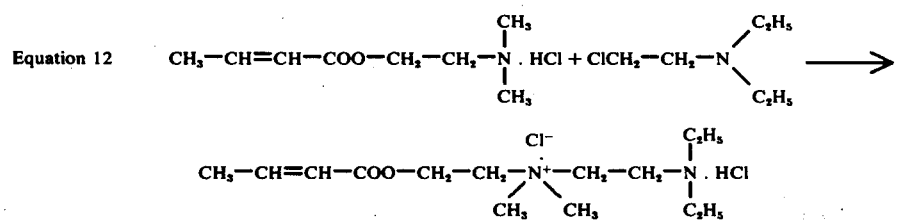

EXAMPLE 13

Following the procedure of Example 1, there was charged 268 parts (one mole) of N-(2-chloroethyl)di- 1 to 10 can readily be made by the process of Example 1; the terminal amino group of the thus obtained products can then be quaternized in the manner illustrated in Example 2 or 3 to obtain the diquaternized products of Formula 2 in which n is 1 to 10. Similarly, by the use of a tertiary amine of Formula 3, in which the group A is an oxygen interrupted alkylene group, monomers of Formula 1 in which the group A adjacent to the carboxyl group is an oxygen interrupted alkylene group may be obtained, and if desired may be similarly quaternized to produce the corresponding products of Formula 2. Such tertiary amines of Formula 3, in which A is an oxygen interrupted alkylene group, may be prepared by an ester interchange reaction between say methyl- or ethyl-acrylate or methacrylate and the 2 to 20 mole adduct of an alkylene oxide, such as ethylene oxide, onto a secondary amine, such as dimethylamine, diethylamine, N-methylanilne, N-ethylanilne or phenylenediamine.

POLYMERS AND COPOLYMERS

The novel cationic monomers of this invention may be readily polymerized or copolymerized with such monomers as styrene, vinyl acetate, vinyl chloride, alkyl acrylates, alkyl methacrylates, acrylamide and acrylonitrile via conventional techniques in bulk, solvent or emulsion polymerization systems and using redox polymerization catalysts. The polymers and copolymers so obtained contain pendant quaternary ammonium groups which impart a definite cationic character to polymers and, in the case of the cationic monomers of Formula 1 above, these pendant groups also contain a terminal amino group thus imparting amino functionality to the polymers.

In the case of copolymers, the amount of cationic monomer, relative to the amount of noncationic comonomer, employed in their preparation will depend on the degree and type of cationic activity desired in the copolymer and also on the particular cationic monomer used and also on the particular comonomer used therewith. As little as about 0.25% by weight of the cationic monomers of the present invention impart a definite cationic character to the resulting copolymer and in emulsion polymerization systems up to at least 10% by weight of these cationic monomers does not present any difficulties. In some applications where a high degree of quaternary ammonium functionality is desired in the polymer backbone, it has been found that the particle size of conventional systems increases rapidly and substantial coagulum results when the relative amount of these cationic monomers exceeds a certain minimum. Such minimum can be readily determined, by preliminary test, for any particular system and by proper selection of the specific emulsifier employed it is possible to create latices containing at least about 20% by weight of these cationic monomers in essentially all cases and up to at least 50% by weight and frequently 60% by weight or somewhat higher in many cases.

EXAMPLE 14

A terpolymer emulsion of vinyl acetate (ethyl acrylate) product of Example 1, containing approximately 40% solids, was prepared from the following components.

| | |
|---|---|
| 1. Deionized water | 312 g. |
| 2. Alacsan QNA (a 60% active cationic emulsifier available from Alcolac Inc.) | 20 g. |
| 3. Vinyl acetate | 340 g. |
| 4. Ethyl acrylate | 40 g. |
| 5. A 10% active aqueous solution of the product of Example 1 | 200 g. |
| 6. Sodium persulfate (10% aqueous solution) | 16 g. |
| 7. Sodium bisulfite (2% aqueous solution) | 60 g. |

The polymerization was carried out as follows. To a 1.5 liter polymerization flask, equipped with agitator, thermometer, condenser and two dropping funnels, there was charged (1) and (2). Nitrogen purge and agitation were started and continued throughout the reaction.

The mixture in the flask was heated to 50° C. and there were added simultaneously 10% of premixed monomers (3) and (4); 10% of (5); and all of (6).

Ten percent of (7) were then added and reaction mixture allowed to exotherm to 60° C. The remainder of (3), (4) and (5) were added gradually and simultaneously over a period of 75 minutes. Reaction temperature was maintained at 65°–72° C. without external cooling by regulating the rate of monomer addition.

After all monomers had been added, the temperature was raised to 85° C., the balance of (7) added and heating continued for 1 hour at 85° C.

We claim:
1. A polymerizable cationic monomer having the formula:

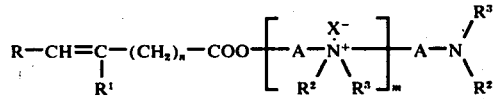

and the quaternized derivatives thereof having the formula:

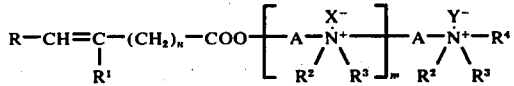

wherein
A, each of which may be the same or different, represents a divalent alkylene group of from 1 to 20 carbon atoms or a polyglycol ether group of the formula

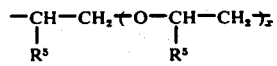

wherein $R^5$ represents H, methyl or ethyl and $x$ represents an integer of from 1 to 20;
R represents H or methyl;
$R^1$ represents H or, when R is H, an alkyl group of 1 to 4 carbon atoms;
$R^2$, $R^3$ and $R^4$, each of which may be the same or different, each represents alkyl of from 1 to 20 carbon atoms, phenyl, benzyl or the $R^2$ and $R^3$, on the same nitrogen atom, taken together represent a divalent aliphatic group of 4 to 5 atoms which jointly with the amino nitrogen forms a pyrrolidinyl, piperidinyl, morpholino or thiamorpholino heterocyclic amino group;
X and Y, each of which may be the same or different, each represents an anion;

$n$ represents an integer, including 0, of from 0 to 10; and $m$ represents an integer of from 1 to 5.

2. A polymerizable cationic monomer as defined in claim 1 and having the formula:

$$R-CH=C(R^1)-(CH_2)_n-COO-A-N^+(R^2)(R^3) \; X^- \; -(CH_2)_y-N(R^3)(R^2)$$

and the quaternized derivatives thereof having the formula:

$$R-CH=C(R^1)-(CH_2)_n-COO-A-N^+(R^2)(R^3) \; X^- \; -(CH_2)_y-N^+(R^2)(R^3)-R^4 \; Y^-$$

wherein:

A represents a divalent alkylene group of from 1 to 20 carbon atoms or a polyglycol ether group of the formula $$-CH(R^5)-CH_2-(O-CH(R^5)-CH_2)_x-$$

wherein $R^5$ represents H, methyl or ethyl and $x$ represents an integer of from 1 to 20;

R represents H or methyl;

$R^1$ represents H or, when R is H, an alkyl group of 1 to 4 carbon atoms;

$R^2$, $R^3$ and $R^4$, each of which may be the same or different, each represents alkyl of from 1 to 20 carbon atoms, phenyl, benzyl or the $R^2$ and $R^3$, on the same nitrogen atom, taken together represent a divalent aliphatic group of 4 to 5 atoms which jointly with the amino nitrogen forms a pyrrolidinyl, piperidinyl, morpholino or thiamorpholino heterocyclic amino group;

X and Y, which may be the same or different, each represents an anion;

$n$ represents an integer, including 0, of from 0 to 10; and $y$ represents an integer of from 1 to 20.

3. A polymerizable cationic monomer as defined in Claim 1 and having the formula:

$$R-CH=C(R^1)-(CH_2)_n-COO-A-N^+(R^2)(R^3)\;X^-\;-CH(R^5)-CH_2-(OCH(R^5)-CH_2)_x-N(R^3)(R^2)$$

and the quaternized derivatives thereof having the formula:

$$R-CH=C(R^1)-(CH_2)_n-COO-A-N^+(R^2)(R^3)\;X^-\;-CH(R^5)-CH_2-(OCH(R^5)-CH_2)_x-N^+(R^2)(R^3)-R^4\;Y^-$$

wherein:

A represents a divalent alkylene group of from 1 to 20 carbon atoms or a polyglycol ether group of the formula $$-CH(R^5)-CH_2-(O-CH(R^5)-CH_2)_x-$$

R represents H or methyl;

$R^1$ represents H or, when R is H, an alkyl group of 1 to 4 carbon atoms;

$R^2$, $R^3$ and $R^4$, each of which may be the same or different, each represents alkyl of from 1 to 20 carbon atoms, phenyl, benzyl or the $R^2$ and $R^3$, on the same nitrogen atom, taken together represent a divalent aliphatic group of 4 to 5 atoms which jointly with the amino nitrogen forms a pyrrolidinyl, piperidinyl, morpholino or thiamorpholino heterocyclic amino group;

X and Y, which may be the same or different, each represents an anion;

$R^5$ represents H, methyl or ethyl;

$x$ represents an integer or from 1 to 20; and $n$ represents an integer, including 0, of from 0 to 10.

4. A polymerizable cationic monomer as defined in claim 1 and having the formula:

$$R-CH=C(R^1)-(CH_2)_n-COO-(CH_2)_y-N^+(R^2)(R^3)\;X^-\;-(CH_2)_y-N(R^3)(R^2)$$

and the quaternized derivatives thereof having the formula:

$$R-CH=C(R^1)-(CH_2)_n-COO-(CH_2)_y-N^+(R^2)(R^3)\;X^-\;-(CH_2)_y-N^+(R^2)(R^3)-R^4\;Y^-$$

wherein:

R represents H or methyl;

$R^1$ represents H or, when R is H, an alkyl group of 1 to 4 carbon atoms;

$R^2$, $R^3$ and $R^4$, each of which may be the same or different, each represents alkyl of from 1 to 20 carbon atoms, phenyl, benzyl or the $R^2$ and $R^3$, on the same nitrogen atom, taken together represent a divalent aliphatic group of 4 to 5 atoms which jointly with the amino nitrogen forms a pyrrolidinyl, piperidinyl, morpholino or thiamorpholino heterocyclic amino group;

X and Y, which may be the same or different, each represents an anion;

$n$ represents an integer, including 0, of from 0 to 10; and $y$, each of which may be the same or different, represents an integer of from 1 to 20.

5. A polyerizable cationic monomer as defined in claim 1 and having the formula:

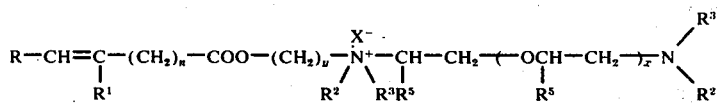

and the quaternized derivatives thereof having the formula:

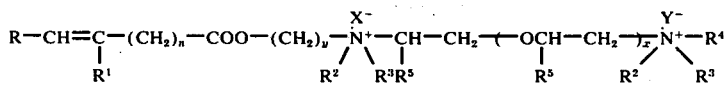

wherein:
R represents H or methyl;
$R^1$ represents H or, when R is H, an alkyl group of 1 to 4 carbon atoms;
$R^2$, $R^3$ and $R^4$, each of which may be the same or different, each represents alkyl of from 1 to 20 carbon atoms, phenyl, benzyl or the $R^2$ and $R^3$, on the same nitrogen atom, taken together represent a divalent aliphatic group of 4 to 5 atoms which jointly with the amino nitrogen forms a pyrrolidinyl, piperidinyl, morpholino or thiamorpholino heterocyclic amino group;
$R^5$ represents H, methyl or ethyl;
X and Y, which may be the same or different, each represents an anion;
n represents an integer, including 0, of from 0 to about 10;
x represents an integer of from 1 to 20; and
y represents an integer of from 1 to 20.

6. A polymerizable cationic monomer as defined in claim 1 and having the formula:

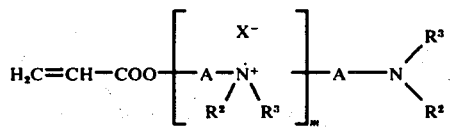

and the quaternized derivatives thereof having the formula:

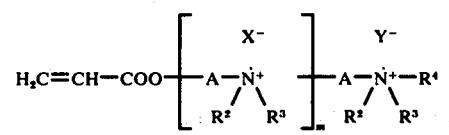

wherein:
A, each of which may be the same or different, represents a divalent alkylene group of from 1 to 20 carbon atoms or a polyglycol ether group of the formula

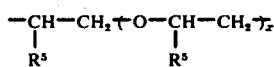

wherein $R^5$ represents H, methyl or ethyl and x represents an integer of from 1 to 20;
$R^2$, $R^3$ and $R^4$, each of which may be the same or different, each represents alkyl of from 1 to 20 carbon atoms, phenyl, benzyl or the $R^2$ and $R^3$, on the same nitrogen atom, taken together represent a divalent aliphatic group of 4 to 5 atoms which jointly with the amino nitrogen forms a pyrrolidinyl, piperidinyl, morpholino or thiamorpholino heterocyclic amino group;
X and Y, each of which may be the same or different, each represents an anion; and
m represents an integer of from 1 to 5.

7. A polymerizable cationic monomer as defined in claim 6 and having the formula:

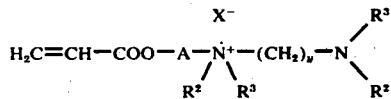

and the quaternized derivatives therof having the formula:

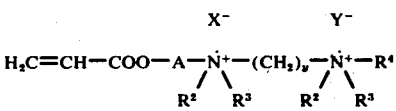

wherein;
A represents a divalent alkylene group of from 1 to 20 carbon atoms or a polyglycol ether group of the formula

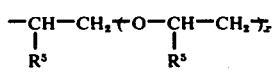

wherein $R^5$ represents H, methyl or ethyl and x represents an integer of from 1 to 20;
$R^2$, $R^3$ and $R^4$, each of which may be the same or different, each represents alkyl of from 1 to 20 carbon atoms, phenyl, benzyl or the $R^2$ and $R^3$, on the same nitrogen atom, taken together represent a divalent aliphatic group of 4 to 5 atoms which jointly with the amino nitrogen forms a pyrrolidinyl, piperidinyl, morpholino or thiamorpholino heterocyclic amino group;
X and Y, which may be the same or different, each represents an anion; and
y represents an integer of from 1 to 20.

8. A polymerizable cationic monomer as defined in claim 6 and having the formula:

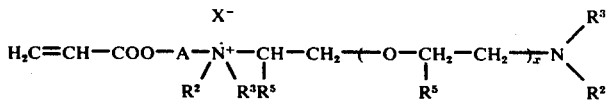

and the quaternized derivatives thereof having the formula:

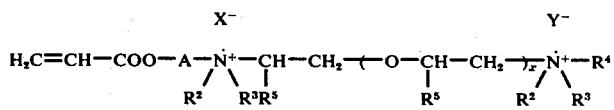

wherein;
A represents a divalent alkylene group of from 1 to 20 carbon atoms or a polyglycol ether group of the formula

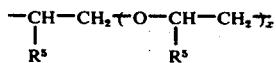

$R^2$, $R^3$ and $R^4$, each of which may be the same or different, each represents alkyl of from 1 to 20 carbon atoms, phenyl, benzyl or the $R^2$ and $R^3$, on the same nitrogen atom, taken together represent a divalent aliphatic group of 4 to 5 atoms which jointly with the amino nitrogen forms a pyrrolidinyl, piperidinyl, morpholino or thiamorpholino heterocyclic amino group;

$R^5$ represents H, methyl or ethyl;

X and Y, which may be the same or different, each represents an anion; and $x$ represents an integer of from 1 to 20.

9. A polymerizable cationic monomer as defined in claim 1 and having the formula:

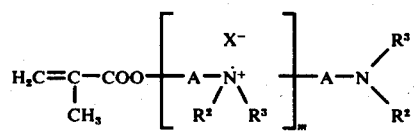

and the quaternized derivatives thereof having the formula:

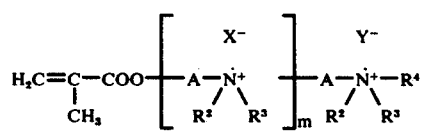

A, each of which may be the same or different, represents a divalent alkylene group of from 1 to 20 carbon atoms or a polyglycol ether group of the formula

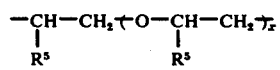

wherein $R^5$ represents H, methyl or ethyl and $x$ represents an integer of from 1 to 20;

$R^2$, $R^3$ and $R^4$, each of which may be the same or different, each represents alkyl of from 1 to 20 carbon atoms, phenyl, benzyl or the $R^2$ and $R^3$, on the same nitrogen atom, taken together represent a divalent aliphatic group of 4 to 5 atoms which jointly with the amino nitrogen forms a pyrrolidinyl, piperidinyl, morpholino or thiamorpholino heterocyclic amino group;

X and Y, each of which may be the same or different, each represents an anion; and $m$ represents an integer of from 1 to 5.

10. A polymerizable cationic monomer as defined in claim 9 and having the formula:

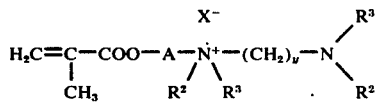

and the quaternized derivatives thereof having the formula:

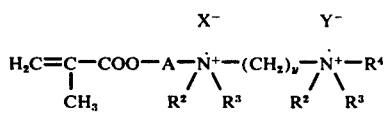

wherein:
A represents a divalent alkylene group of from 1 to 20 carbon atoms or a polyglycol ether group of the formula

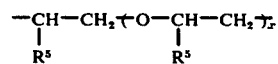

wherein $R^5$ represents H, methyl or ethyl and $x$ represents an integer of from 1 to 20;

$R^2$, $R^3$, and $R^4$, each of which may be the same or different, each represents alkyl of from 1 to 20 carbon atoms, phenyl, benzyl or the $R^2$ and $R^3$, on the same nitrogen atom, taken together represent a divalent aliphatic group of 4 to 5 atoms which jointly with the amino nitrogen forms a pyrrolidinyl, piperidinyl, morpholino or thiamorpholino heterocyclic amino group;

X and Y, which may be the same or different, each represents an anion; and $y$ represents an integer of from 1 to 20.

11. A polymerizable cationic monomer as defined in claim 9 and having the formula:

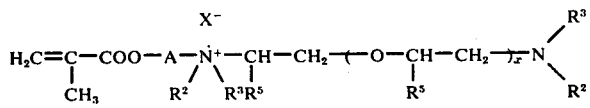

and the quaternized derivative thereof having the formula:

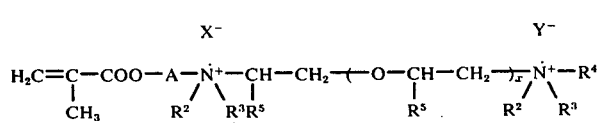

wherein:
A represents a divalent alkylene group of from 1 to 20 carbon atoms or a polyglycol ether group of the formula

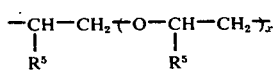

$R^2$, $R^3$ and $R^4$, each of which may be the same or different, each represents alkyl of from 1 to 20 carbon atoms, phenyl, benzyl or the $R^2$ and $R^3$, on the same nitrogen atom, taken together represent a divalent aliphatic group of 4 to 5 atoms, which jointly with the amino nitrogen forms a pyrrolidinyl, piperidinyl, morpholino or thiamorpholino heterocyclic amino group;
$R^5$ represents H, methyl or ethyl;
X and Y, which may be the same or different, each represents an anion; and
x represents an integer of from 1 to 20.

12. A polymerizable cationic monomer as defined in claim 10 and having the formula:

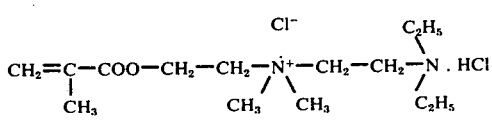

13. A polymerizable cationic monomer as defined in claim 10 and having the formula:

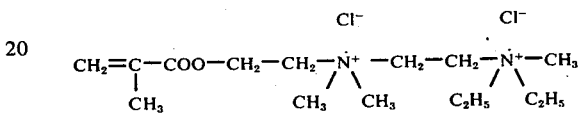

14. A polymerizable cationic monomer as defined in claim 10 and having the formula:

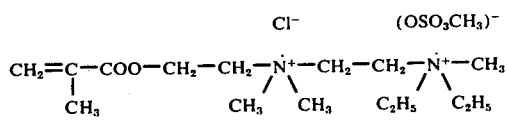

15. A polymerizable cationic monomer as defined in claim 9 and having the formula:

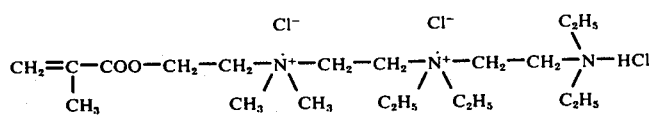

16. A polymerizable cationic monomer as defined in claim 11 and having the formula:

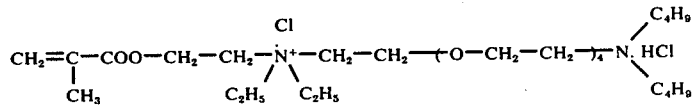

* * * * *

UNITED STATES PATENT AND TRADEMARK OFFICE
CERTIFICATE OF CORRECTION

PATENT NO. : 4,009,201

DATED : February 22, 1977

INVENTOR(S) : Robert Steckler and Seymour Martin Linder

It is certified that error appears in the above-identified patent and that said Letters Patent are hereby corrected as shown below:

Column 1, line 52 that portion of the formula reading

Column 4, line 53 "priviously" should read --- previously ---
Column 4, last line "Equation B" should read --- Equation A ---
Column 5, line 2 (2nd line of Eq. A) that portion of the formula

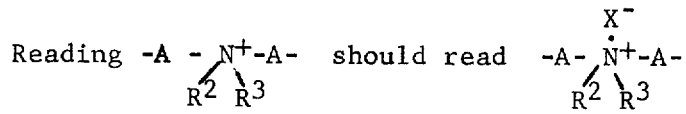

Column 8, line 57 "0.5 parts" should read --- 50.5 parts ---
Column 9, line 34 (1st line of Eq. 3) that portion of the formula

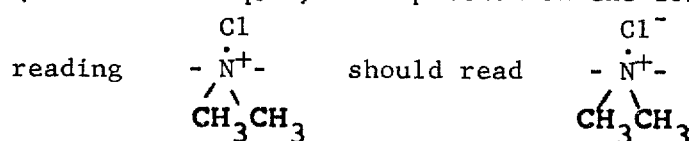

Column 10, line 1 "dimethylaminoethyl" should read --- diethyl aminoethyl ---
Column 14, line 25 (2nd line of Eq. 12) that portion of the formula

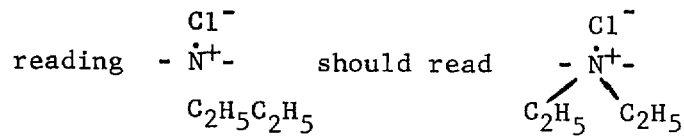

Signed and Sealed this

Eleventh Day of July 1978

[SEAL]

Attest:

RUTH C. MASON
Attesting Officer

DONALD W. BANNER
Commissioner of Patents and Trademarks